United States Patent
Uno

(10) Patent No.: US 8,508,195 B2
(45) Date of Patent: Aug. 13, 2013

(54) PFC CONVERTER USING A PREDETERMINED VALUE THAT VARIES IN SYNCHRONIZATION WITH A PHASE OF THE INPUT VOLTAGE

(75) Inventor: Yoshiyuki Uno, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 13/406,602

(22) Filed: Feb. 28, 2012

(65) Prior Publication Data

US 2012/0155132 A1 Jun. 21, 2012

Related U.S. Application Data

(63) Continuation of application No. PCT/JP2010/063294, filed on Aug. 5, 2010.

(30) Foreign Application Priority Data

Sep. 11, 2009 (JP) ................................. 2009-210721

(51) Int. Cl.
*G05F 1/656* (2006.01)
*G05F 1/613* (2006.01)

(52) U.S. Cl.
USPC ........... 323/222; 323/210; 323/223; 323/266; 323/282; 323/285; 323/288

(58) Field of Classification Search
USPC ................. 323/210, 222, 223, 266, 282, 285, 323/288
See application file for complete search history.

(56) References Cited

U.S. PATENT DOCUMENTS

| | | | | |
|---|---|---|---|---|
| 5,764,039 A | * | 6/1998 | Choi et al. | 323/222 |
| 5,949,229 A | * | 9/1999 | Choi et al. | 323/320 |
| 6,175,218 B1 | | 1/2001 | Choi et al. | |
| 6,657,417 B1 | * | 12/2003 | Hwang | 323/222 |
| 6,946,819 B2 | * | 9/2005 | Fagnani et al. | 323/207 |
| 6,984,963 B2 | * | 1/2006 | Pidutti et al. | 323/207 |
| 7,307,405 B2 | * | 12/2007 | Adragna et al. | 323/207 |
| 7,391,631 B2 | * | 6/2008 | Shimada | 363/89 |
| 7,453,248 B2 | * | 11/2008 | Takeuchi | 323/285 |

FOREIGN PATENT DOCUMENTS

| | | |
|---|---|---|
| CA | 2011492 A1 | 9/1990 |
| JP | 3-40752 A | 2/1991 |
| JP | 3-70085 U | 7/1991 |
| JP | 7-75329 A | 3/1995 |
| JP | 7-115774 A | 5/1995 |
| JP | 10-80135 A | 3/1998 |
| JP | 10-94246 A | 4/1998 |
| JP | 2000-139079 A | 5/2000 |
| JP | 2007-143383 A | 6/2007 |

OTHER PUBLICATIONS

Official Communication issued in International Patent Application No. PCT/JP2010/063294, mailed on Nov. 2, 2010.

* cited by examiner

*Primary Examiner* — Bao Q Vu
(74) *Attorney, Agent, or Firm* — Keating & Bennett, LLP

(57) ABSTRACT

A PFC converter that prevents and reduces switching losses by controlling ripple of inductor current and enables application for high power usage, includes a switching device that is turned off when an inductor current flowing through an inductor reaches a first threshold value, and turned on when the inductor current reaches a second threshold value. A switching control circuit sets a reference value of the inductor current using results from an input voltage detection circuit and an output voltage detection circuit. The first threshold value is produced by adding a predetermined value to the reference value, and the second threshold value is produced by subtracting the predetermined value from the reference value.

8 Claims, 6 Drawing Sheets

PFC CONVERTER USING A PREDETERMINED VALUE THAT VARIES IN SYNCHRONIZATION WITH A PHASE OF THE INPUT VOLTAGE

BACKGROUND OF THE INVENTION

1. Field of the Invention

The present invention relates to a PFC converter for improving power factor, which is a type of AC-DC converter that receives Alternating-Current (AC) power supply and outputs a Direct-Current (DC) voltage.

2. Description of the Related Art

In a typical switching power supply apparatus using a commercial AC power supply for input power, the commercial AC power is converted to a DC voltage by rectifying and smoothing, and then the DC voltage is subjected to a switching operation in a DC-DC converter. Accordingly, an input current becomes discontinuous and is significantly distorted as compared to a sinusoidal wave, generating harmonic currents. To prevent damage caused by such harmonic currents, harmonic current regulations classified by usage or input power are imposed on power supplies of electronic equipment in Japan, Europe, etc.

To cope with these regulations, a circuit known as a PFC (power factor correction circuit) converter is added to the power supply of electronic equipment to suppress the harmonic currents. A typical PFC converter is now described with reference to FIG. 1 of Japanese Unexamined Utility Model Registration Application Publication No. 3-70085.

An input power is supplied from a commercial AC power supply Vi through a low pass filter FIL, and is converted into a pulsating voltage by a full-rectification circuit RF1. The pulsating voltage is input to a chopper circuit in the subsequent stage. The chopper circuit includes a rectifying-and-smoothing circuit formed of an inductor L1, a switching device Q1, a diode D1 and a smoothing capacitor C1. The turning-on and turning-off operations of the switching device Q1 included in the chopper circuit are controlled in such a manner that the waveform of an input current Iir becomes similar to the waveform of an input voltage Vi, i.e., a sinusoidal wave-like shape with the same phase.

A control circuit includes an error amplifier A, a circuit B for detecting when an inductor current becomes zero, a current detector F, a voltage detector G, a multiplier H, a comparator E, a pulse generator C and a driver circuit D.

The multiplier H outputs a value produced by multiplying the output of the voltage detector G by the output of the error amplifier A, which corresponds to a voltage between two terminals of the smoothing capacitor C1. When the output value of the multiplier H exceeds the output value of the current detector F, the switching device Q1 is turned off by the driver circuit D via the pulse generator C. When the current flowing through the inductor L1 becomes zero, the detection circuit B sends a signal to turn on the switching device Q1 again. By repeating these operations, the peak value of the current flowing through the inductor L1 forms a sinusoidal waveform since the output of the voltage detector G also forms a sinusoidal waveform, thereby making the average value of the current form a sinusoidal waveform as well. Consequently, the power factor is improved because of the sinusoidal input current Iir, and the harmonic currents are suppressed to a certain level or lower. This control method is known as the critical current mode method.

In addition to the critical current mode, the continuous current mode is well known as a control mode. In the continuous current mode, the switching frequency is fixed, and the turning-on and turning-off operations are controlled so that the average value of the inductor current flowing through the inductor follows a reference sinusoidal wave.

As still another control method, Japanese Unexamined Patent Application Publication No. 7-75329 describes a method in which upper and lower limits are set with minute spacing therebetween relative to a reference sinusoidal wave, and controls the turning-on and turning-off operations of the switching device so as to occur between these limits.

However, in the continuous current mode, there is a drawback in that the loss becomes large because of switching losses generated by the turning-on and the turning-off operations. In the critical current mode, the input current is limited to one-half of the inductor current peak value. Thus, there is a drawback in that application thereof for high power usage is difficult. In the other control method in which the upper and lower limits with minute spacing therebetween are set relative to the reference sinusoidal wave, it is difficult to reduce the switching losses since the range of control is limited to the minute spacing.

SUMMARY OF THE INVENTION

Preferred embodiments of the present invention provide a PFC converter that prevents and suppresses switching losses by controlling the ripple of inductor current as well as enabling application for high power usage.

A PFC converter according to a preferred embodiment of the present invention includes a rectifier circuit that rectifies an AC voltage input from an AC input power supply; a series circuit that includes an inductor and a switching device, the series circuit being connected in a subsequent stage of the rectifier circuit; a rectifying-and-smoothing circuit connected in parallel to the switching device; an input voltage detector that detects an input voltage supplied from the rectifier circuit; an inductor current detector that detects a current flowing through the inductor; an output voltage detector that detects an output voltage of the rectifying-and-smoothing circuit; and a switching controller that controls the switching device so that an average value of the inductor current forms a shape similar to that of the input voltage; wherein the switching device is turned off when the inductor current reaches a first threshold value, and turned on when the inductor current reaches a second threshold value; the switching controller sets a reference value of the inductor current using results from the input voltage detector and the output voltage detector; and the first threshold value is produced by adding a predetermined value to the reference value, and the second threshold value is produced by subtracting the predetermined value from the reference value.

A PFC converter according to another preferred embodiment of the present invention includes a series circuit that is connected in parallel to a load and includes a first switching device and a first rectifying device; an inductor connected between a first input terminal of an AC input power supply and a connecting point of the first switching device and the first rectifying device; a second series circuit that is connected in parallel to the load and includes a second switching device and a second rectifying device, a connecting point of the second switching device and the second rectifying device being connected to a second input terminal of the AC input power supply; a smoothing circuit connected in parallel to the load; an input voltage detector that detects an input voltage supplied from the AC input power supply; an output voltage detector that detects an output voltage of the smoothing circuit; an inductor current detector that detects a current flowing through the inductor; and a switching controller that controls the first and second switching devices so that an average value of the inductor current forms a shape similar to that of the input voltage; wherein the first and second switching devices are turned off when the inductor current reaches a first threshold value, and turned on when the inductor current reaches a second threshold value; the switching controller sets a reference value of the inductor current using results from the input voltage detector and the output voltage detector; and the first threshold value is produced by adding a predetermined value to the reference value, and the second threshold value is produced by subtracting the predetermined value from the reference value.

It is preferable that the predetermined value varies in synchronization with the phase of the input voltage.

It is also preferable that the turning-on operation of the switching device is delayed when the load is light and the reference value of the inductor current is small.

It is preferable that the subsequent turning-on operation of the switching device is carried out after the elapse of a predetermined period from a point in time of a zero current or the turning-on operation or the turning-off operation of the switching device.

It is also preferable that the predetermined period varies in synchronization with the phase of the input voltage.

According to various preferred embodiments of the present invention, the switching frequency may be lowered by arbitrarily setting the ripple of the inductor current in response to the load. As a result, unnecessary switching losses is prevented and reduced. Furthermore, the PFC converter can be applied for high power usage.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of a PFC converter according to the present invention will be described below with reference to drawings.

First Preferred Embodiment

Figure 1:
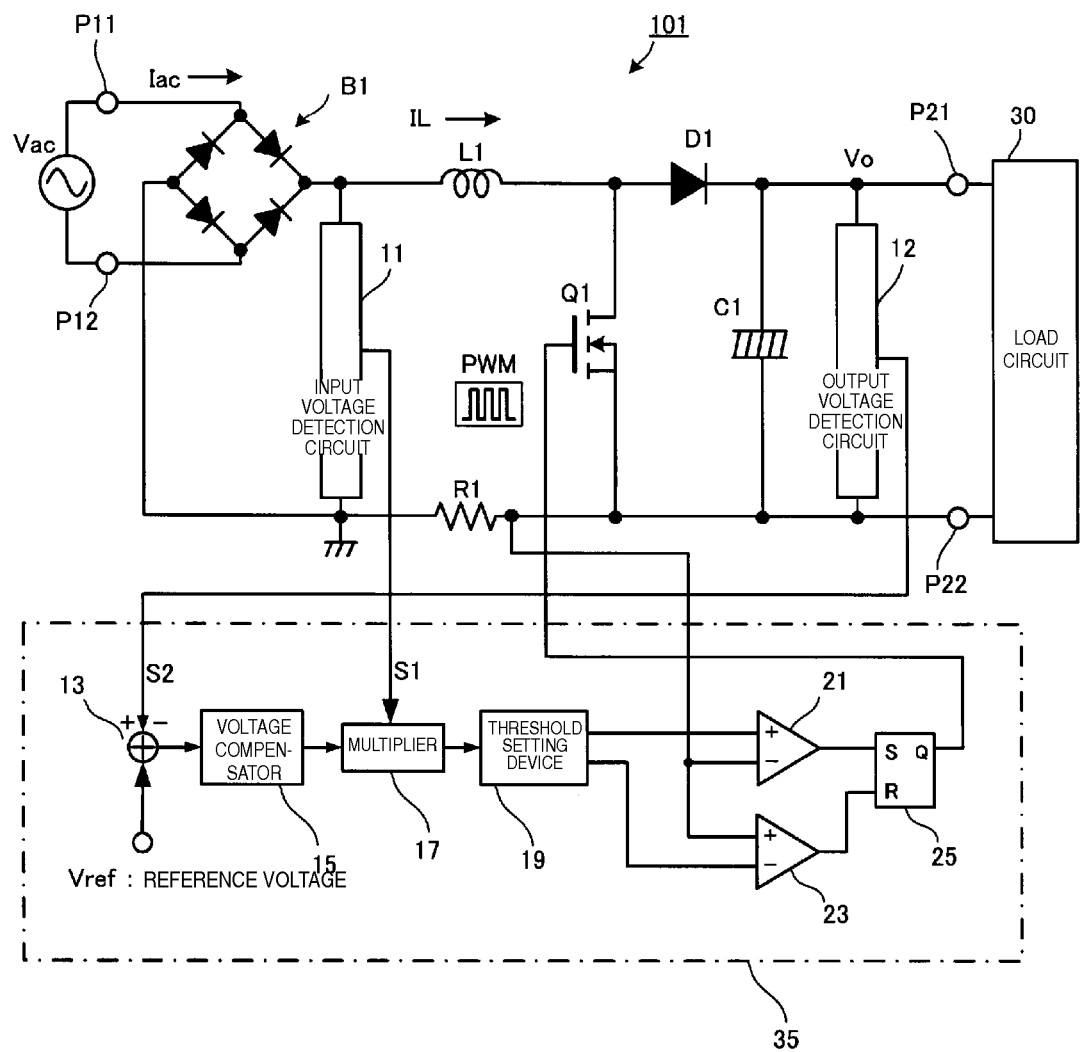
FIG. 1 is a circuit block diagram of a PFC converter according to a first preferred embodiment of the present invention.

FIG. 1 is a circuit block diagram of a PFC converter according to the first preferred embodiment. In FIG. 1, reference numerals P11 and P12 denote input terminals of a PFC converter 101, and P21 and P22 denote output terminals of the PFC converter 101. An AC input power supply Vac, which is a commercial AC power supply, is input to the input terminals P11-P12, and a load circuit 30 is connected to the output terminals P21-P22.

The load circuit 30 may include, for example, a DC-DC converter and circuits of an electronic device, which receives power from the DC-DC converter.

In the input stage of the PFC converter 101, a diode bridge B1, which is a rectification circuit, performs full-wave rectification on an AC voltage of the AC input power supply Vac. In the output side of the diode bridge B1, a series circuit including an inductor L1 and a switching device Q1 is connected. A current detecting resistance R1 is connected to the switching device Q1 in series to detect a current flowing through the inductor L1. To both ends of the series circuit including the switching device Q1 and the current detecting resistance R1, a rectifying-and-smoothing circuit including a diode D1 and a smoothing capacitor C1 is connected in parallel. The inductor L1, switching device Q1, diode D1 and smoothing capacitor C1 define a so-called boost chopper circuit.

Between output side terminals of the diode bridge B1, an input voltage detection circuit 11 is provided. Furthermore, between the output terminals P21-P22, an output voltage detection circuit 12 is provided.

A switching control circuit 35 includes an adder element 13 that compares a detection signal S2 of the output voltage detection circuit 12 and a reference voltage Vref, a voltage compensator 15, a multiplier 17 that multiplies a detection signal S1 of the input voltage detection circuit 11 by an output of the voltage compensator 15, a threshold setting device 19, comparators 21, 23 that compare a detection signal of the current detecting resistance R1 and outputs of the threshold setting device 19, and a flip-flop 25.

The adder element 13 inputs an error between an output voltage Vo and the reference voltage Vref to the voltage comparator 15.

The multiplier 17 generates a reference value to control an inductor current. The reference value is produced by multiplying the detection signal S1 of the input voltage detection circuit 11 by the output of the voltage compensator 15 so that the average inductor current follows a sinusoidal wave having a shape similar to the shape of the input voltage.

The threshold setting device 19 generates the first threshold value and the second threshold value by adding and subtracting a predetermined value to and from the reference value produced at the multiplier 17, respectively. The predetermined value may be set arbitrarily in consideration of a load power, an inductor saturation current, a phase of the input voltage, etc., so that resultant switching losses are reduced.

The first and second threshold values are input to the comparators 21 and 23, respectively, and are each compared with the inductor current detected by the current detecting resistance R1. When the comparator 23 detects that the inductor current is higher than the first threshold value, a signal is input to a reset terminal of the flip-flop 25 and the switching device Q1 is turned off. When the comparator 21 detects that the inductor current is lower than the second threshold value, a signal is input to a set terminal of the flip-flop 25 and the switching device Q1 is turned on.

Figure 2:
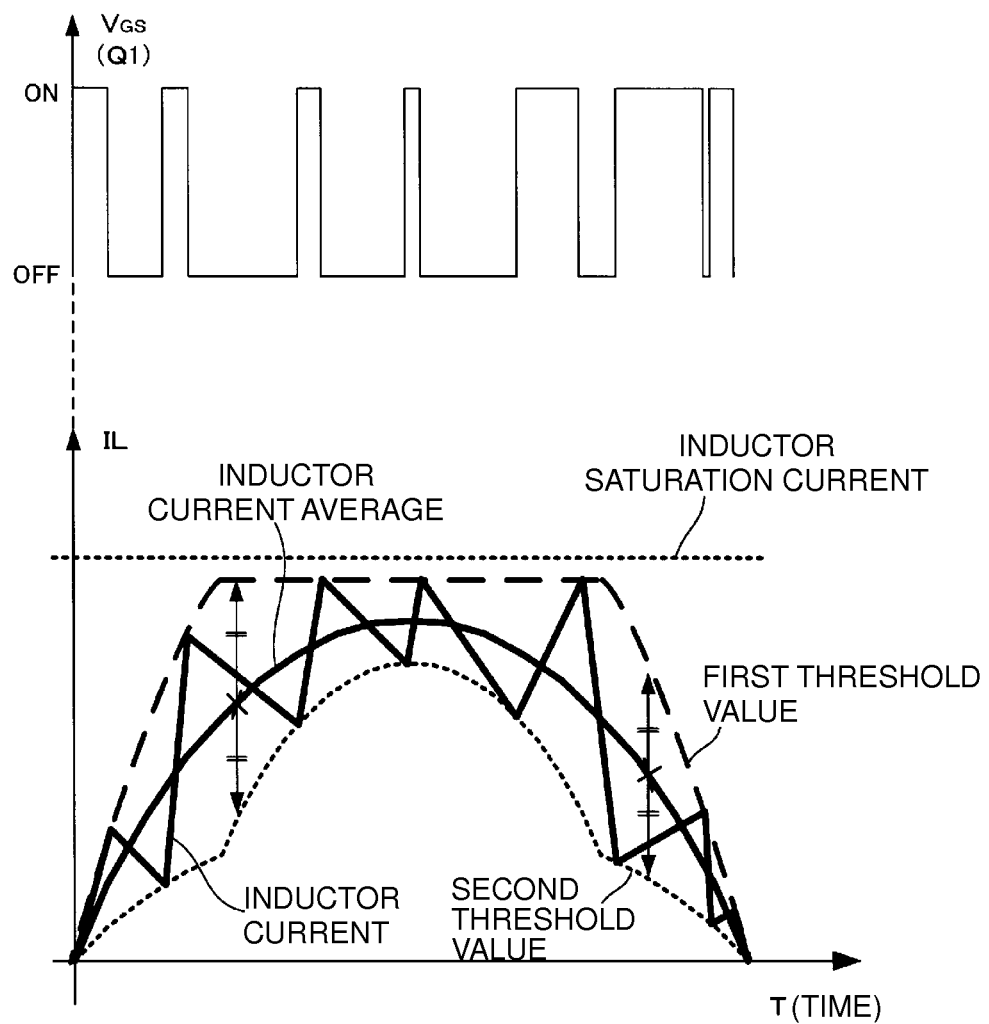
FIG. 2 is a diagram illustrating a waveform of PWM pulses to be applied to a switching device, a waveform of inductor current, a first and second threshold values in the first preferred embodiment of the present invention.

FIG. 2 illustrates a waveform of the inductor current, the first and second threshold values during a half cycle of the AC input power supply according to the first preferred embodiment. It illustrates that the switching device is controlled such that the switching device is turned off when the inductor current reaches the first threshold value, and turned on when the inductor current reaches the second threshold value.

The setting of the predetermined value during a half cycle of the AC input power supply illustrated in FIG. 2 will be described in detail.

In a preferred embodiment of the present invention, the predetermined value is preferably set so as to have larger ripple within a range where the inductor current ripple does not exceed the inductor saturation current. As a result, the number of switching operations may be reduced. Switching losses occur when the switching device is turned on and turned off. Accordingly, the switching losses may be reduced because of the smaller number of switching operations.

As illustrated in FIG. 2, in a half cycle of the AC input power supply, the predetermined value preferably is set so that the ripple may become larger near a leading edge and a trailing edge of the inductor current, making it possible to reduce the switching losses. Near a peak of the inductor current, the predetermined value is preferably set to a smaller value so as to be controlled in such a way that the ripple does not exceed the inductor saturation current.

As described in the above, the predetermined value is allowed to vary in synchronization with the phase of the input voltage. Accordingly, the switching losses may be reduced while the inductor saturation current is being considered.

When the load power changes, the predetermined value may be set as follows. When the load power becomes smaller, a control operation is performed to make the inductor current average smaller. At that time, the difference between the reference value and the inductor saturation current becomes larger. Thus, the predetermined value may be set to a larger value. Accordingly, the switching losses may be reduced even near a peak of the inductor current.

When the load power becomes larger, it may be necessary to make the inductor current average larger. However, if the size of ripple were the same as that in the case when the load power is smaller, the ripple may exceed the inductor saturation current. In such a case, the ripple of the inductor current may be controlled to remain in the range where the ripple of the inductor current does not exceed the inductor saturation current by setting the predetermined value to a smaller value, making application possible for high power usage.

In the operation of the first preferred embodiment, the switching frequency is not fixed. Accordingly, the operation may be performed with reduced EMI noise.

To set the predetermined value appropriately in accordance with the input voltage or the load power, it is preferable to use a DSP (digital signal processor) as the switching control circuit 35.

Second Preferred Embodiment

Figure 3:
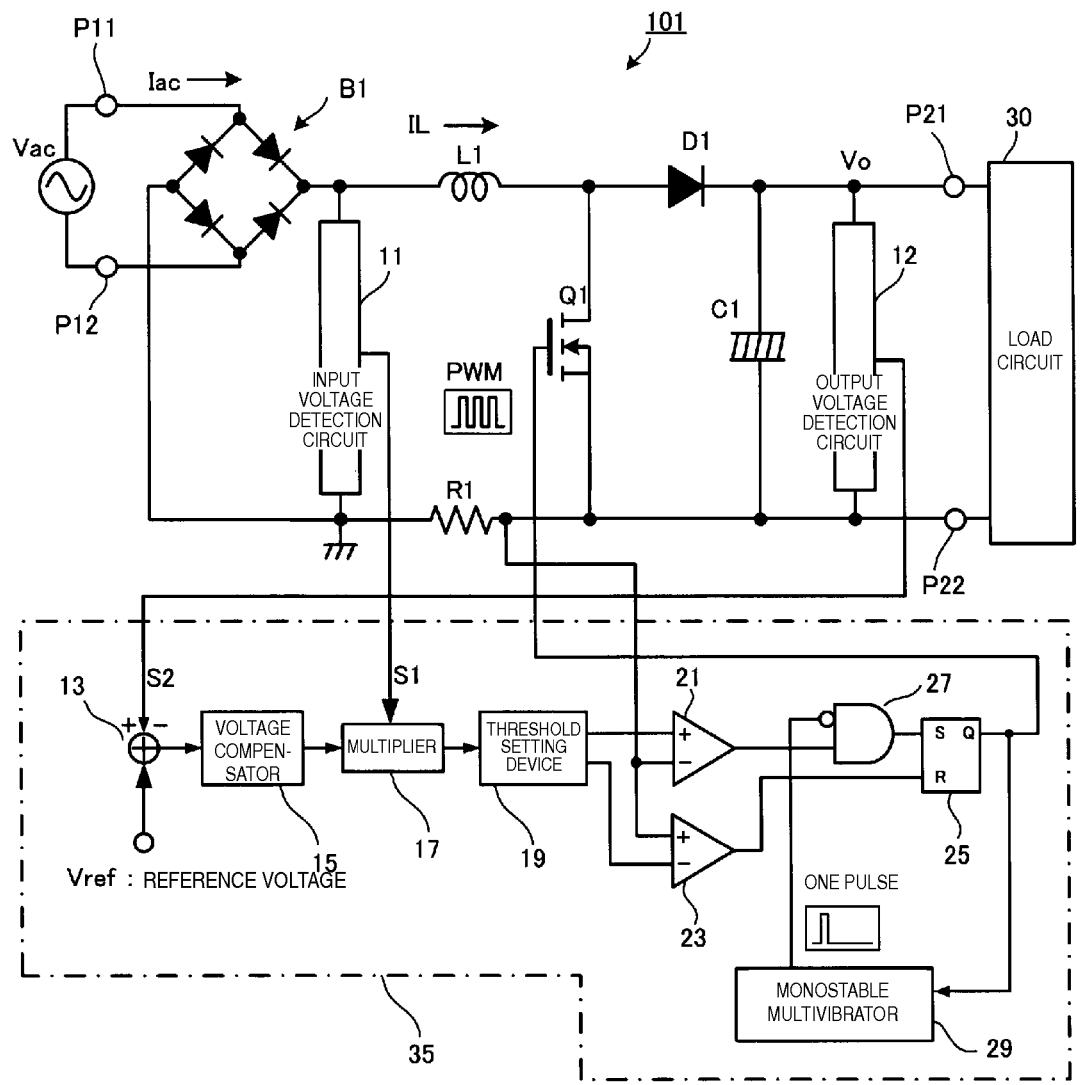
FIG. 3 is a circuit block diagram of a PFC converter according to a second preferred embodiment of the present invention.

FIG. 3 is a circuit block diagram of a PFC converter according to the second preferred embodiment. A characteristic portion is provided in the subsequent stage of the comparator 21, and includes an AND circuit 27 and a monostable multivibrator 29 that outputs a one-pulse signal.

Figure 4:
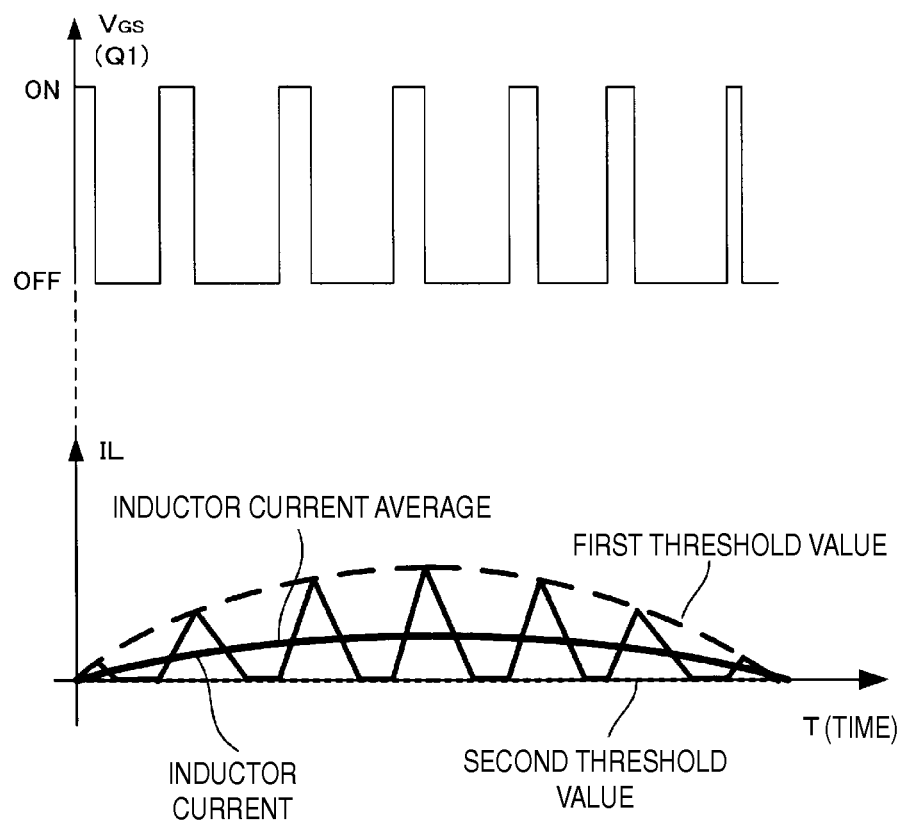
FIG. 4 is a diagram illustrating a waveform of PWM pulses to be applied to a switching device, a waveform of inductor current, a first and second threshold values in the second preferred embodiment of the present invention.

A detection result of a turning-on output signal from the flip-flop 25 is input to the monostable multivibrator 29. That input triggers the monostable multivibrator 29 to output a one-pulse with a constant period. That one-pulse is input to the AND circuit together with the output of the comparator 21. The subsequent turning-on operation of the switching device is prohibited during the one-pulse period. According to the above, when a period between one turning-on operation to the subsequent turning-on operation is less than a predetermined period, the execution of the subsequent turning-on operation is delayed until after the elapse of the predetermined period. Accordingly, the operation may be carried out with having discontinued periods in the inductor current as illustrated in FIG. 4. As a result, for example, the use of higher switching frequency may be prevented when the load is light.

The monostable multivibrator 29 may output the one-pulse not only when the switching device is turned on but also when the switching device is turned off or when the current flowing through the switching device becomes zero. The predetermined time for the delay may vary in response to the phase of the input voltage.

Third Preferred Embodiment

Figure 5:
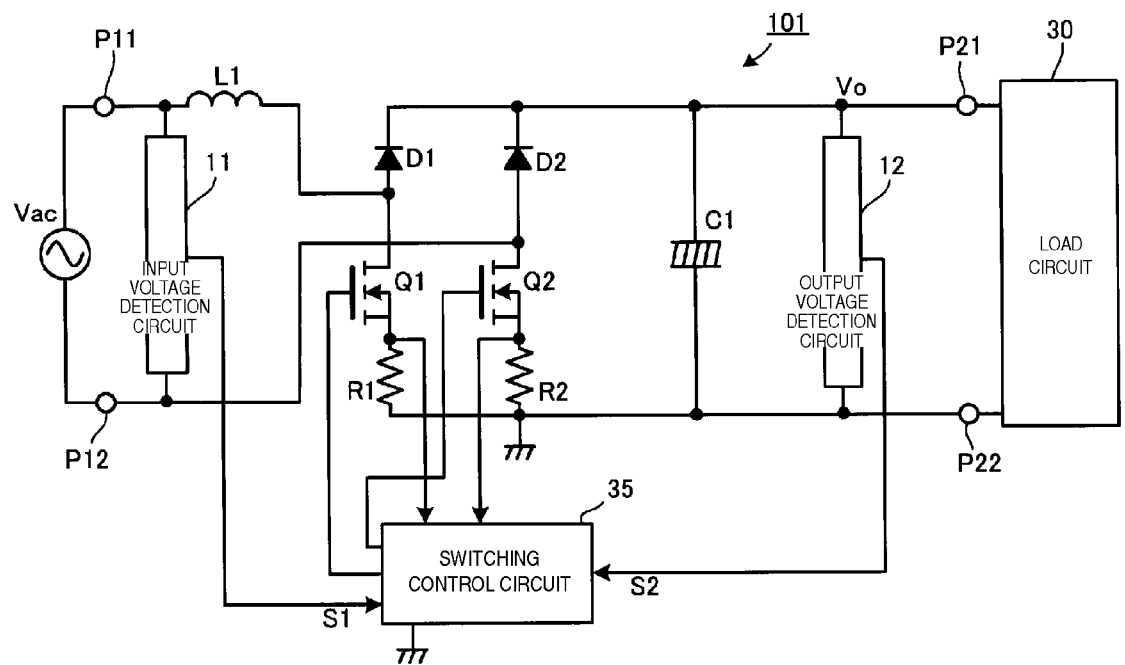
FIG. 5 is a circuit block diagram of a PFC converter according to a third preferred embodiment of the present invention.

FIG. 5 is a circuit block diagram of a PFC converter according to the third preferred embodiment. FIGS. 6A-6D are diagrams illustrating current flow paths in a PFC converter 101 at four instances of time.

The PFC converter 101 illustrated in FIG. 5 is a diode-bridgeless PFC converter including two switching devices and an inductor directly connected to the input power supply without using the diode bridge.

In FIG. 5, reference numerals P11 and P12 denote input terminals of the PFC converter 101, and P21 and P22 denote output terminals of the PFC converter 101. An AC input power supply Vac, which is a commercial AC power supply, is input to the input terminals P11-P12, and a load circuit 20 is connected to the output terminals P21-P22.

The load circuit 20 may include, for example, a DC-DC converter and circuits of an electronic device, which receives the power from the DC-DC converter.

An input voltage detection circuit 11 is provided in the input stage of the PFC converter 101. An inductor L1 is connected in series to one of channels of the input stage. A bridge circuit including diodes D1, D2 and switching devices Q1, Q2 is connected to the subsequent stage of the inductor L1. Current detecting resistances R1 and R2 are connected to the switching devices Q1 and Q2 between their sources and the ground. A smoothing circuit including a smoothing capacitor C1 is connected to the output of the bridge circuit.

Figure 6A:
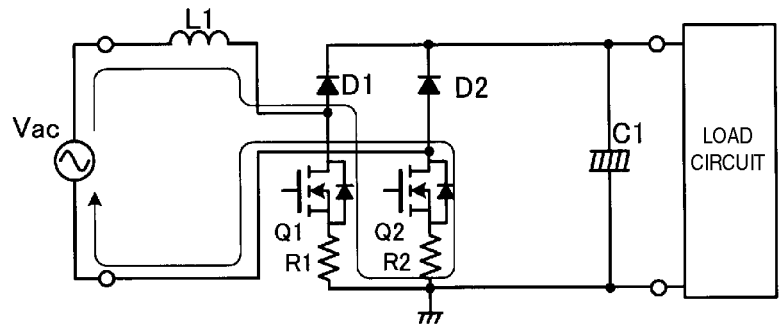
FIGS. 6A-6D are diagrams illustrating current flow paths in the PFC converter according to the third preferred embodiment of the present invention at four instances of time.
Figure 6B:
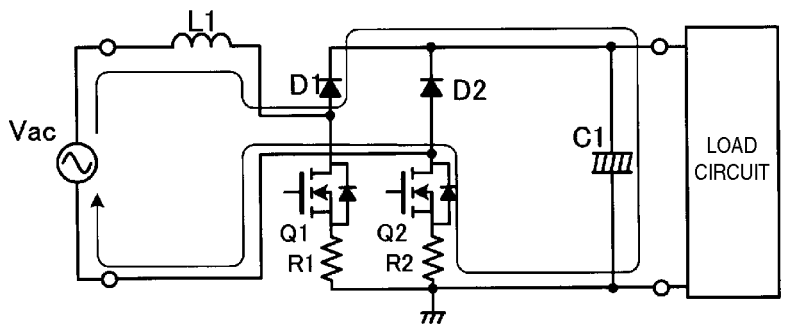

FIG. 6A illustrates the current flow path when both the switching devices Q1 and Q2 are ON during the positive half cycle of the AC input power supply. FIG. 6B illustrates the current flow path when both the switching devices Q1 and Q2 are OFF during the positive half cycle of the AC input power supply.

Figure 6C:
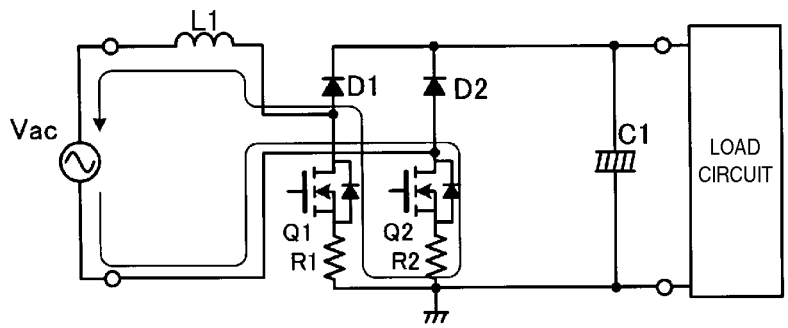
Figure 6D:
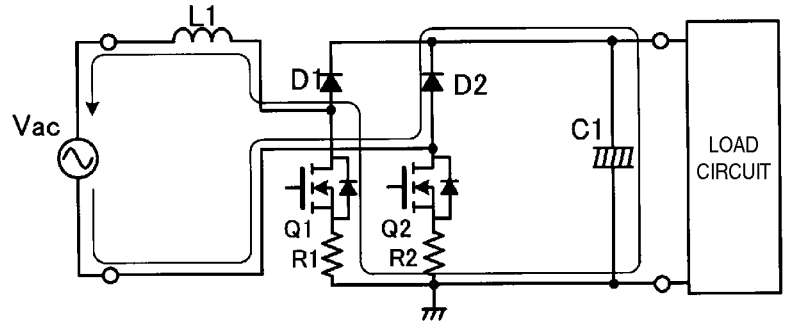

FIG. 6C illustrates the current flow path when both the switching devices Q1 and Q2 are ON during the negative half cycle of the AC input power supply. FIG. 6D illustrates the current flow path when both the switching devices Q1 and Q2 are OFF during the negative half cycle of the AC input power supply.

During the positive half cycle of the AC input power supply, when the Q1 and Q2 are ON, the current flows along the path illustrated in FIG. 6A and the magnetic energy is stored in the inductor L1. Furthermore, when the Q1 and Q2 are OFF, the current flows along the path illustrated in FIG. 6B, and the magnetic energy is released from the inductor L1. In that time, the current flows through a parasitic diode of the Q2. Similarly, during the negative half cycle of the AC input power supply, when the Q1 and Q2 are ON, the current flows along the path illustrated in FIG. 6C and the magnetic energy is stored in the inductor L1. Furthermore, when the Q1 and Q2 are OFF, the magnetic energy is released from the inductor L1 at the timing illustrated in FIG. 6D. In that time, the current flows through a parasitic diode of the Q1.

The current detecting resistance R1 and the current detecting resistance R2 are arranged to detect the current flowing through the inductor L1 during the positive half cycle of the AC input power supply or the negative half cycle of the AC input power supply. A switching control circuit 35 illustrated in FIG. 5 controls the inductor current by using the method described in the first preferred embodiment or the second preferred embodiment.

When the inductor current is controlled by using a method similar to that of the first preferred embodiment, as illustrated in FIG. 2, the first threshold value and the second threshold value generated in the switching control circuit 35 are compared with the inductor current at the comparators, and the Q1 and Q2 are each turned on or off accordingly.

When the inductor current is controlled by using a method similar to that of the second preferred embodiment, as illustrated in FIG. 4, the execution of the subsequent turning-on operation is delayed until after the elapse of the predetermined period when the period between one turning-on operation to the subsequent one is less than the predetermined period based on the detection result of the turning-on output signal.

In the second preferred embodiment and the third preferred embodiment described in the above, the ease of control may also be achieved by using a DSP (Digital Signal Processor) as the switching control circuit 35.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A PFC converter comprising:
a rectifier circuit that rectifies an AC voltage supplied from an AC input power supply;
a series circuit that includes an inductor and a switching device, the series circuit being connected in a subsequent stage of the rectifier circuit;
a rectifying-and-smoothing circuit connected in parallel to the switching device;
an input voltage detector that detects an input voltage supplied from the rectifier circuit;
an inductor current detector that detects a current flowing through the inductor;
an output voltage detector that detects an output voltage of the rectifying-and-smoothing circuit; and
a switching controller arranged and programmed to control the switching device so that an average value of the inductor current defines a shape similar to that of the input voltage; wherein
the switching device is turned off when the inductor current reaches a first threshold value, and turned on when the inductor current reaches a second threshold value;
the switching controller sets a reference value of the inductor current using results from the input voltage detector and the output voltage detector;
the first threshold value is produced by adding a predetermined value to the reference value, and the second threshold value is produced by subtracting the predetermined value from the reference value; and
the predetermined value varies in synchronization with a phase of the input voltage.

2. The PFC converter according to claim 1, wherein a turning-on operation of the switching device is delayed when the load is light and the reference value of the inductor current is small.

3. The PFC converter according to claim 2, wherein a subsequent turning-on operation of the switching device is carried out after an elapse of a predetermined period from a point in time of a zero current or a turning-on operation or a turning-off operation of the switching device.

4. The PFC converter according to claim 3, wherein the predetermined period varies in synchronization with a phase of the input voltage.

5. A PFC converter comprising:
a first series circuit that is connected in parallel to a load and includes a first switching device and a first rectifier device;
an inductor connected between a first input terminal of an AC input power supply and a connecting point of the first switching device and the first rectifying device;
a second series circuit that is connected in parallel to the load and includes a second switching device and a second rectifying device, a connecting point of the second switching device and the second rectifying device being connected to a second input terminal of the AC input power supply;
a smoothing circuit connected in parallel to the load;
an input voltage detector that detects an input voltage supplied from the AC input power supply;
an output voltage detector that detects an output voltage of the smoothing circuit;
an inductor current detector that detects a current flowing through the inductor; and
a switching controller arranged and programmed to control the first and second switching devices so that an average value of the inductor current defines a shape similar to that of the input voltage; wherein
the first and second switching devices are turned off when the inductor current reaches a first threshold value, and turned on when the inductor current reaches a second threshold value;
the switching controller sets a reference value of the inductor current using results from the input voltage detector and the output voltage detector;
the first threshold value is produced by adding a predetermined value to the reference value, and the second threshold value is produced by subtracting the predetermined value from the reference value; and
the predetermined value varies in synchronization with a phase of the input voltage.

6. The PFC converter according to claim 5, wherein a turning-on operation of the switching device is delayed when the load is light and the reference value of the inductor current is small.

7. The PFC converter according to claim 6, wherein a subsequent turning-on operation of the switching device is carried out after an elapse of a predetermined period from a point in time of a zero current or a turning-on operation or a turning-off operation of the switching device.

8. The PFC converter according to claim 7, wherein the predetermined period varies in synchronization with a phase of the input voltage.

* * * * *